United States Patent [19]
Hasenauer et al.

[11] Patent Number: 6,078,433
[45] Date of Patent: Jun. 20, 2000

[54] ZOOM LENS SYSTEM

[75] Inventors: David M. Hasenauer, Monrovia; Barry G. Broome, Carlsbad; Donald G. Koch, Burbank, all of Calif.

[73] Assignee: Intel Corporation, Santa Clara, Calif.

[21] Appl. No.: 09/002,905

[22] Filed: Jan. 5, 1998

[51] Int. Cl.[7] .................................................... G02B 15/14
[52] U.S. Cl. ........................................... 359/691; 359/676
[58] Field of Search .................................... 359/676, 677, 359/678, 679, 680, 681, 682, 683, 684, 685, 686, 687, 688, 689, 690, 691, 692

[56] References Cited

U.S. PATENT DOCUMENTS

| | | |
|---|---|---|
| 5,044,706 | 9/1991 | Chen . |
| 5,235,465 | 8/1993 | Hayashi . |
| 5,539,581 | 7/1996 | Sato . |
| 5,872,658 | 2/1999 | Ori .......................................... 359/677 |

*Primary Examiner*—Hung Xuan Dang
*Attorney, Agent, or Firm*—Blakely, Sokoloff, Taylor & Zafman LLP

[57] ABSTRACT

A compact zoom lens system having four injection-molded singlet lens elements is described. In one embodiment, the compact zoom lens system includes a lens carrier and first and second lens elements coupled to the lens carrier. One surface of the first or second lens elements having a diffractive optical surface disposed thereon to correct chromatic aberrations of light passing therethrough. The lens carrier moves the first and second lens elements axially to change a focal length of the lens system. Third and fourth lens elements are fixed on either side of the first and second lens elements. The lens carrier includes an aperture stop placed proximate to the diffractive optical surface to correct chromatic aberrations over an entire range of focal lengths. The first lens element is made out of flint-like material while the other lens elements are made out of crown-like material. Moreover, the zoom lens system includes an anti-aliasing surface on one of the lens elements to control aliasing effects. A plurality of light suppression elements are provided to suppress stray light paths from scattering across a detector array of the zoom lens system.

27 Claims, 4 Drawing Sheets

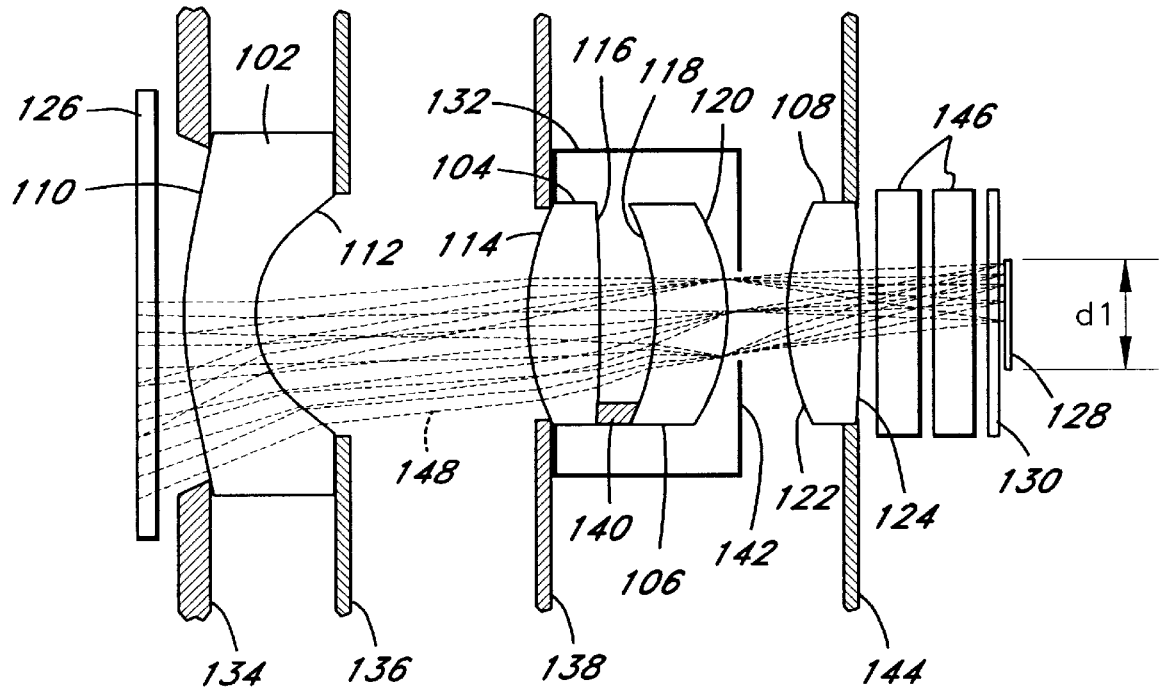
FIG. IA
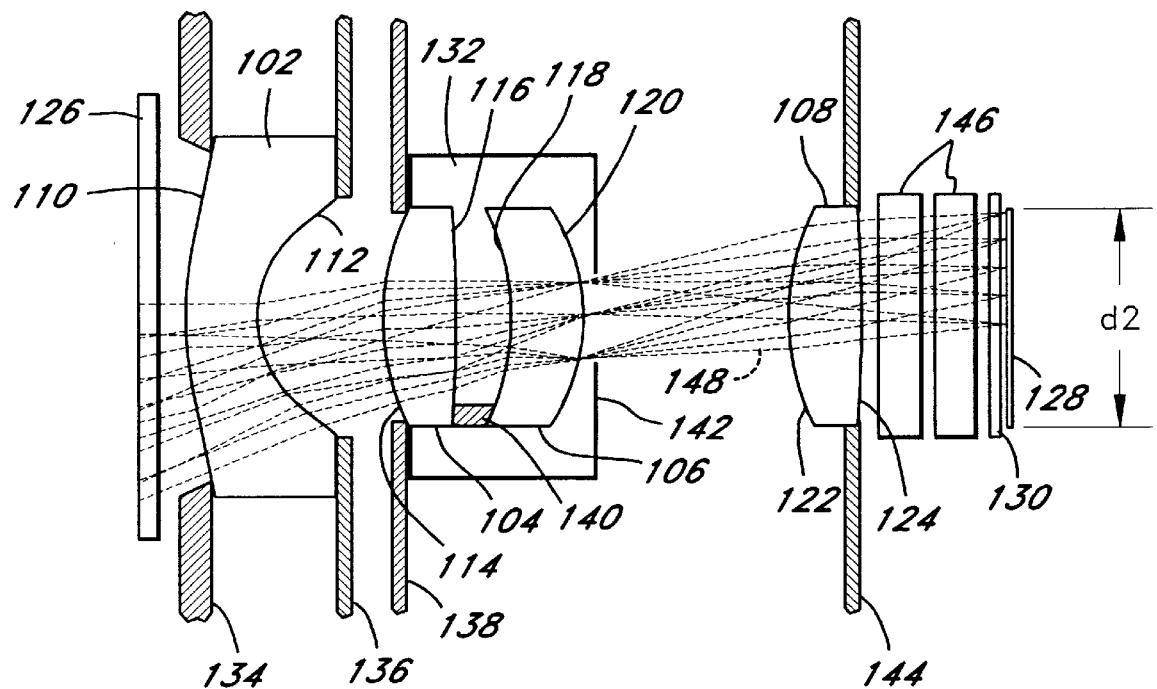
FIG. IB

ZOOM LENS SYSTEM

BACKGROUND OF THE INVENTION

1. Field of the Invention

The present invention relates generally to the field of lens systems, and specifically, to a compact zoom lens system that has a diffractive surface and an anti-aliasing feature.

2. Background Information

Prior art zoom lens systems operating in the f/2.8 relative aperture domain and covering fields of view approaching 50 degrees require many expensive lens elements to achieve usable image quality. Usually, these elements are made of optical glasses that have very different dispersion properties to permit good correction of chromatic aberrations. Moreover, zoom lens systems requiring many elements must be several times their longest focal length when measured from their front vertex to an image surface. A compact form that operates in the stated relative aperture and field angle domain requires high-index optical glasses which makes the lens system very expensive to manufacture.

Moreover, optical systems that discretely sample images on detector arrays produce aliasing effects in the displayed image. Color Filter Arrays ("CFAs") integrated into discretely sampled detector arrays introduce color-aliasing effects. An example of aliasing effects in a monochrome (black and white) CCTV image are Moire effects that cause an object to move and change patterns when the object moves relative to a charge coupled device ("CCD") detector array and has dimensions commensurate with the pixel dimensions of the detector array. An example of color aliasing effects in a CFA CCD detector system is the similar Moire effects that cause an object to move, change patterns, and change color when the object moves relative to the detector array and the object has dimensions commensurate with the pixel dimensions of the detector. For example, when a building, having very narrow columns, is carefully observed on a TV system using a CFA detector system in the camera, some columns will have a red tint, some a green tint, and some a blue tint. As the camera moves, the tinted pattern shifts from one column to another.

Recently, anti-aliasing features have been introduced as molded structures near the aperture stop of a lens system. These newer-art devices typically use a single, very weak (i.e., having a height of a few wavelengths of light), four-sided pyramid to form four displaced images at the detector surface. Because each of these four images are formed by a section of the aperture that looks like one-quarter of a pie, the image structure is a function of the size of the aperture stop, the object distance, and the zoom position. In essence, this pyramidal feature divides the incident wavefront from a point object into four pie-shaped wavefronts that converge to four blurred images at the detector. These four tilted wavefront sections change separation as a function of object distance and zoom position. However, this type of anti-aliasing feature is undesirable because the amount of anti-aliasing changes as the size of the aperture stop, the object distance, and the zoom position changes.

Other prior art lens systems have attempted to solve aliasing effects by providing anti-aliasing features that are molded onto a lens surface (using aspheric surface profiles) which introduces spherical aberration to blur the image of a point object. However, this design solution is very sensitive to the relative aperture and object distance and is not acceptable for the intended application.

Another problem with zoom lens systems is the suppression of stray light. Because the mechanical flanges of the lens elements are large and have non-optical surfaces, light entering the front of the flange can propagate through the flange and disperse across the detector array surface.

Accordingly, there is a need in the art for a method and apparatus for a compact zoom lens system that corrects chromatic aberrations over the entire range of the zoom lens system, minimizes aliasing effects, and suppresses stray light while maintaining a low cost.

SUMMARY OF THE INVENTION

In one embodiment, the present invention is a compact zoom lens system that includes a first lens element and a second lens element. A surface on one of the first and second lens elements has a diffractive optical surface disposed thereon to correct chromatic aberrations of light passing therethrough. A lens carrier is coupled to the first and second lens elements to move the first and second lens elements axially to change a focal length of the zoom lens system.

BRIEF DESCRIPTION OF THE DRAWINGS

The features and advantages of the present invention will become apparent from the following detailed description of the present invention in which:

FIG. 1A illustrates one embodiment of a zoom lens system of the present invention.

FIG. 1B illustrates the zoom lens system of FIG. 1A with the zoom lens positioned at a different location.

DESCRIPTION OF THE PREFERRED EMBODIMENT

Figure 2A:
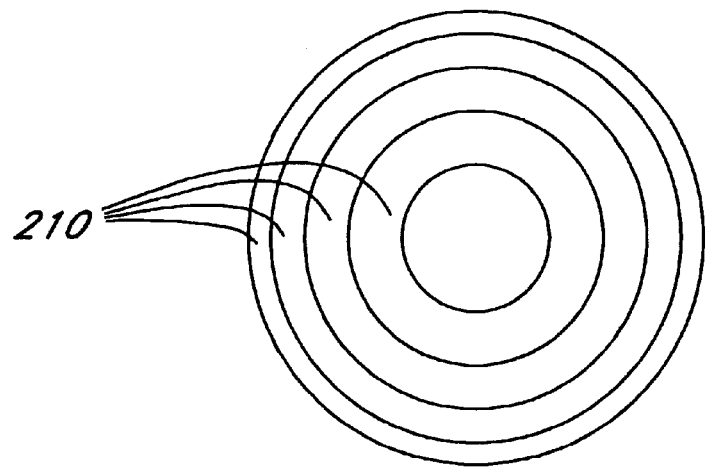
FIG. 2A illustrates a front view of an exemplary diffractive surface of the present invention.

In one embodiment, the present invention is a method and apparatus for a compact zoom lens system having a diffractive surface and an anti-aliasing feature. In particular, the zoom lens system includes four injection-molded plastic lens elements and a diffractive surface to control chromatic aberrations and a molded surface to reduce aliasing effects. The zoom lens system may be used with any imaging system (e.g., cameras, camcorders, video conferencing imagers, etc.) that have isolated pixelated detectors such as, but not limited or restricted to, a charge coupled device ("CCD"), a charge injection device ("CID"), or a complementary metal oxide semiconductor ("CMOS") device.

In the following description, for purposes of explanation, numerous details are set forth in order to provide a thorough understanding of the present invention. However, it will be apparent to one skilled in the art that these specific details are not required in order to practice the present invention.

FIG. 1A illustrates a cross section of a compact zoom lens system 100 suitable for imaging systems that use a discrete detector array and require a very low-cost, compact design. Referring to FIG. 1A, the zoom lens system 100 includes a first lens element 102 having first and second surfaces 110 and 112, a second lens element 104 having first and second surfaces 114 and 116, a third lens element 106 having first and second surfaces 118 and 120, and a fourth lens element 108 having first and second surfaces 122 and 124. The first lens element 102 is closest to the object side while the fourth lens element 108 is closest to an imaging device. The zoom lens system 100 is enclosed within a housing or lens cell (not shown).

The first lens element 102 is used to increase (or modify) the field of view of the zoom lens system 100. In a preferred embodiment, the first lens element 102 has an aspheric first surface 110 (e.g., a tenth order asphere) and a conic second surface 112 (e.g., a concave elliptical surface). The second lens element 104 is a positive lens element and has an aspheric first surface 114 (e.g., a sixth order asphere). Similarly, the fourth lens element 108 is a positive lens element and has an aspheric first surface 122 (e.g., a sixth order asphere). All of the lens elements 102, 104, 106, and 108 are injection molded singlet plastic lens elements. In one embodiment, the zoom lens system 100 covers a f/2.8 relative aperture and a 50 degree field angle. However, it is to be appreciated that the zoom lens system of the present invention may be designed to have a different relative aperture (e.g., f/1.6) and a different degree field angle (e.g., 35 degrees). In a preferred embodiment, the first, third, and fourth lens elements are made out of crown-like material (e.g., acrylic, cyclic olefin co-polymer "COC", etc.) while the second lens element 104 is made out of flint-like material (e.g., SAN, NAS, polycarbonate, styrene, etc.).

A glass window 126 is placed in front of the first lens element 102 to protect the zoom lens system 100 from the environment. On the second side 124 of the fourth lens element 108 is an image plane 128 (hereinafter referred to as a "detector array"). The detector array is rectangular and has a width of d1 (vertical distance), as shown in FIG. 1A, and a length of d2 (horizontal distance), as shown in FIG. 1B. The detector array 128 may be a CCD, CID, or CMOS detector array, to name a few appropriate devices. In front of the detector array 128 is a glass plate 130. Light rays, such as light ray bundle 148 enter the zoom lens system 100 through the glass window 126, propagate through the four lens elements, and onto the detector array 128. The detector array 128 generates a signal that represents an image formed by the light ray bundle.

Continuing to refer to FIG. 1A, the second and third lens elements 104 and 106 are captured or mounted in a lens carrier 132. The lens carrier 132 includes an aperture stop 142 that is located behind and proximate to the third lens element 106 and defines the optical pathway of the light ray bundle 148. The aperture stop 142 is made of opaque black material to suppress stray light. Moreover, a black spacer 140 is placed between the second and third lens elements 104 and 106 to further suppress stray light.

The first and fourth lens elements 102 and 108 are fixed in space. The lens carrier 132 moves the second and third lens elements 104 and 106, the black spacer 140, and the aperture stop 142 axially to change the focal length of the zoom lens system and thereby change the image magnification. This is referred to as the "variator group" of the zoom lens system. In one embodiment, the zoom lens system 100 is used in a dual focal length manner, i.e., only two different object distances and image magnifications are used. FIG. 1A shows the variator group at a first position which provides a first magnification for the zoom lens system 100 while FIG. 1B shows the variator group at a second position which provides a second magnification for the zoom lens system 100.

In an alternative embodiment, the second and third lens elements 104 and 106 move independently along the axial displacement by way of separate lens carriers, in which case the aperture stop 142 moves with the third lens element 106. In yet another alternative embodiment, the second and third lens elements 104 and 106 and the aperture stop 142 move together as shown in FIG. 1A, while either the first lens element 102 or the fourth lens element 108 moves separately along the axial displacement. In both these alternative embodiments, true zoom lens behavior and excellent image quality is achieved over a range of focal lengths to maintain parfocal imaging (i.e., to focus the image on the detector array).

To suppress and prevent stray light from entering the non-optical portions of the lens elements and scattering across the detector array 128, the zoom lens system 100 includes a plurality of baffles (i.e., stray light suppression elements) positioned at optimal locations. The first baffle is an opaque bezel 134 that is placed within the lens cell and covers the non-optical portion of the first lens element 102. The second baffle is an opaque black mylar disk 136 that is placed in contact with the non-optical portion on the rear of the first lens element 102. This prevents light that reaches the non-optical portion of the first lens element 102 from reaching the non-optical portions of the other lens elements and scattering across the detector array 128.

The third baffle is an opaque black mylar disk 138 similar to the second baffle. The opaque disk 138 is placed in contact with and in front of the non-optical portion of the second lens element 104. The fourth baffle is the opaque spacer 140 placed in contact with and in front of the non-optical portion of the third lens element 106. The fifth baffle is the opaque black lens carrier 132 including the aperture stop 142 that is located behind and proximate to the third lens element 106. The sixth baffle is an opaque black mylar disk 144 that is placed adjacent to the second surface 124 of the fourth lens element 108.

Chromatic aberrations are typically severe for plastic lens elements because of the limited number of materials available. Suitable optical plastics have Abbe dispersion numbers of either about 57 (for acrylic or COC) or about 30 (for polystyrene, polycarbonate, SAN, and NAS). In prior art lens systems, chromatic aberrations are typically corrected by using doublets consisting of a high dispersion lens element combined with a low dispersion lens element. This common design practice would increase the number of lens elements of the zoom lens system 100 from four to seven (the first lens element would become a doublet, a negative element would be added between the second and third lens elements, and the fourth lens element would become a doublet). With the present invention, three lens elements are eliminated by using a diffractive surface to balance the chromatic aberrations introduced by the other lens elements. As a result, the zoom lens system achieves a compact dimension from the front vertex of the first lens element to the image surface and achieves a compact dimension of the front lens element diameter.

A positively-powered diffractive surface has the unique property of focusing light by diffraction (instead of refraction at the surface), and this focusing is color dependent in the opposite sign of the focusing error introduced by a simple, positively-powered refractive element. By placing a molded diffractive surface on one of the variator lens element surfaces near the aperture stop, axial chromatic aberration of the lens system over the entire zoom range is corrected.

Figure 2B:
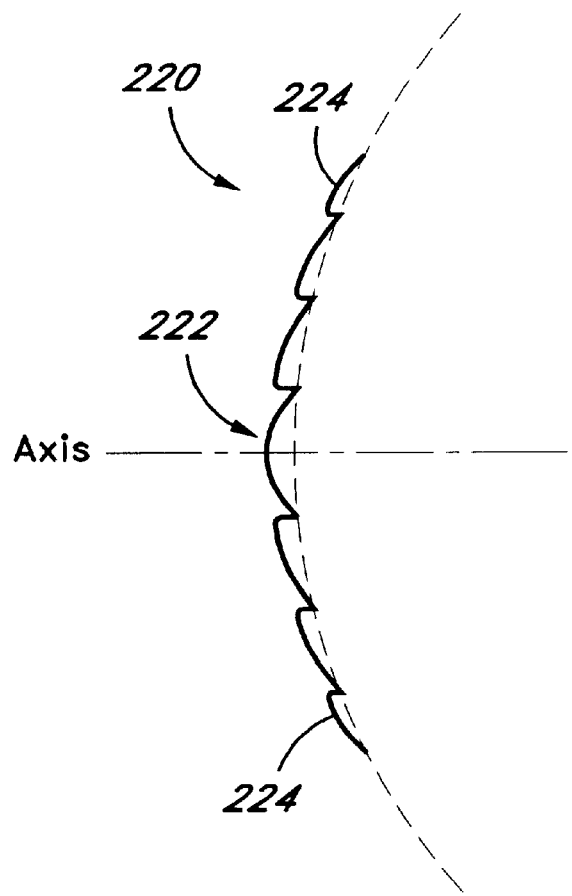
FIG. 2B illustrates a side view of the exemplary diffractive surface.

FIG. 2A illustrates a front view of an exemplary diffractive surface of the present invention. Referring to FIG. 2A, the diffractive surface includes a plurality of rings 210 that are concentric from the center of an aperture. The rings 210 at the center of the surface are widely spaced apart and as the surface is traversed from the center, the rings are more and more closely spaced together. FIG. 2B illustrates a side view of the exemplary diffractive surface 220. As shown in FIG. 2B, the diffractive surface 220 includes a center zone 222 and successive annular zones 224. In the embodiment shown, the diffractive surface 220 adds strong negative axial chromatic aberration which offsets the positive axial chromatic aberration of the remainder of the optical surfaces.

In the preferred embodiment, the diffractive surface is on the second surface 120 of the third lens element 106 to compensate for the residual axial chromatic aberrations of the entire zoom lens system. Lateral chromatic aberrations is corrected by the choice of materials (and their dispersions) in each of the four lens elements. However, it is contemplated that the diffractive surface may be placed on another surface, such as on one of the lens elements within the variator group. Specifically, the axial chromatic aberration of the first (non-moving) lens element 102 and the axial chromatic aberration of the fourth (non-moving) lens element 108 partially cancel one another. What is left is a residual aberration that is balanced to nearly zero by the diffractive surface in the variator group plus the dispersion of the second lens element 104 which is made out of flint-like material. To keep the axial chromatic aberration of the variator group a constant value during its axial displacement, the aperture stop 142 is made part of the variator group. The combination of the aperture stop 142 moving together with the second and third lens elements 104 and 106, the use of flint-like material in the second lens element 104, and the diffractive optical surface 120 adjacent to the aperture stop 142 corrects chromatic aberration over the range of magnification.

In another embodiment, all of the lens elements are made out of crown-like material and a second diffractive surface (preferably on the first lens element 102) is provided to compensate for the chromatic aberration introduced by using crown-like material in the second lens element 104 instead of flint-like material. In yet another embodiment, the zoom lens system 100 includes a flint-like second lens element 104 and a second diffractive surface (e.g., on the first lens element 102). This embodiment produces a much better chromatic aberration correction. However, the higher stray light associated with each diffractive surface makes this embodiment less preferable than a lens system having only one diffractive surface.

Referring back to FIG. 1A, the present invention incorporates birefringent plates 146 to reduce the color aliasing artifacts introduced by sampling the image with a CFA and pixel detector geometry. The birefringent plates 146 are placed directly in front of the detector array 128 as shown in FIG. 1. One birefringent plate essentially takes a point image and produces two displaced point images. A quarter-wave retardation plate placed between two birefringent plates is often used to produce four point images. In this manner, an image is spread out to cover four adjacent pixels on the CFA and reduce the aliasing effect. This process also reduces the image sharpness (i.e. its resolution or acuity) because a point image is blurred across the detector array 128. Anti-aliasing is a careful balance between aliasing artifacts and image resolution.

One advantage of using birefringent plates 146 is that the image is almost insensitive to the relative aperture of the lens system 100 because the optical aberrations that are modified by the size of the aperture stop 142 are smaller than the blur introduced by the birefringent plates 146. A second advantage is that the anti-aliasing effect is nearly independent of zoom position. Disadvantages associated with birefringent plates are that they are modestly expensive, the blurring introduced can not be easily changed, they take up substantial volume, and they are heavy.

Figure 3A:
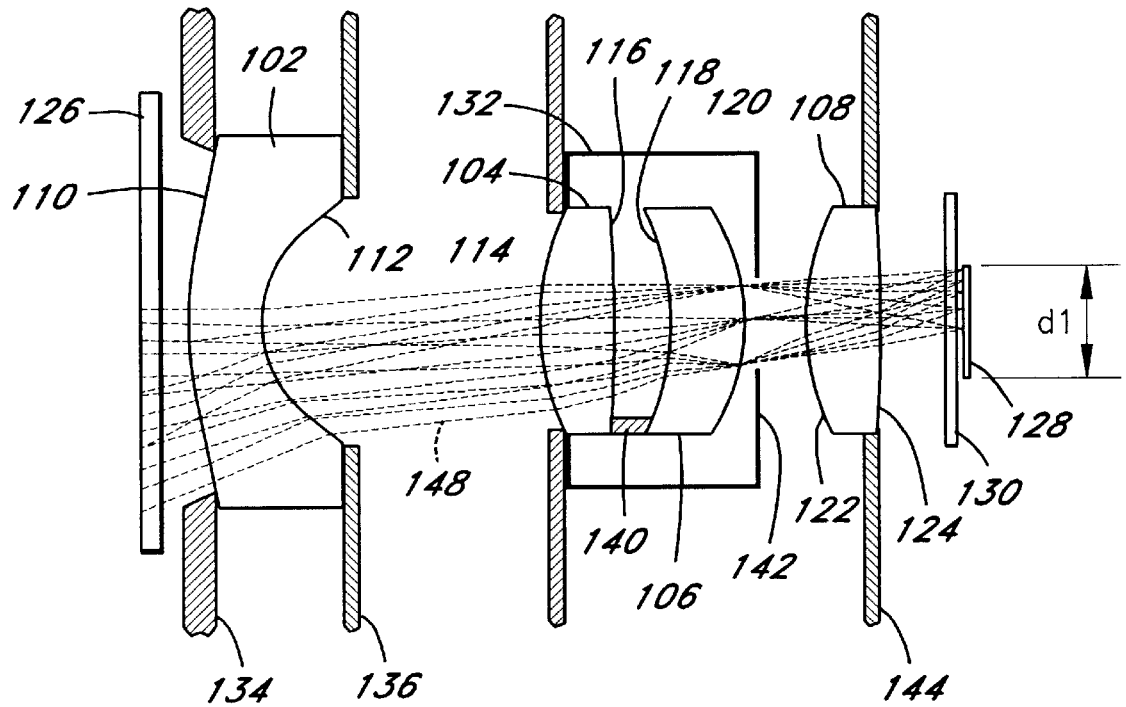
FIG. 3A illustrates a preferred embodiment of a zoom lens system of the present invention.
Figure 3B:
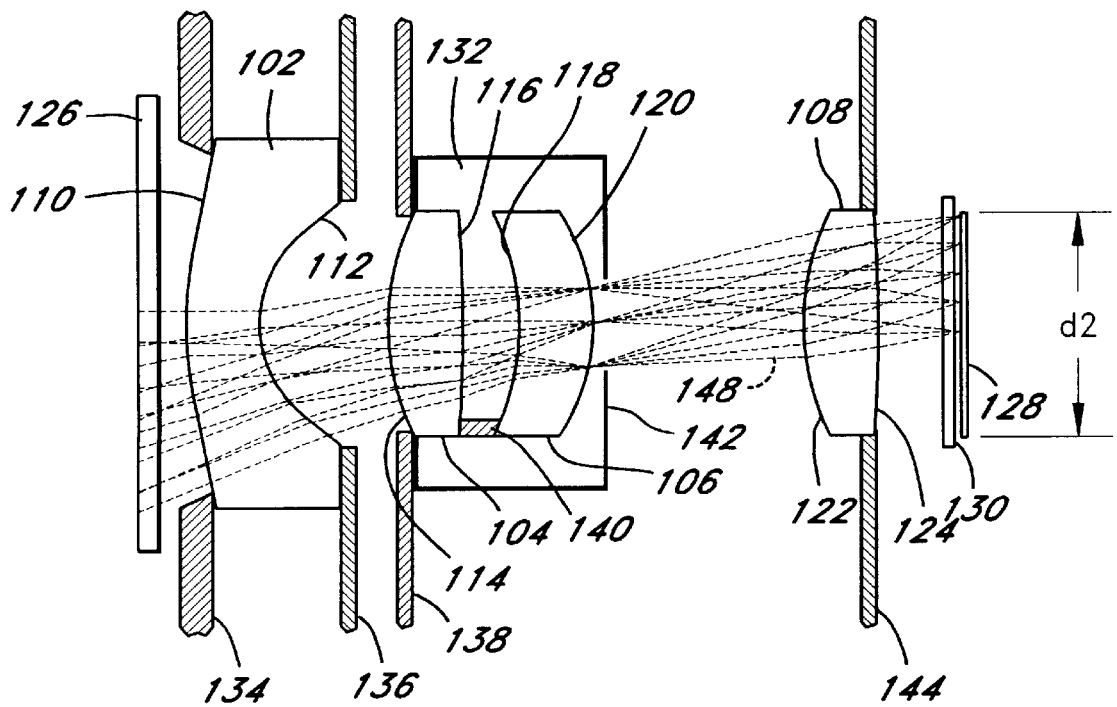
FIG. 3B illustrates the zoom lens system of FIG. 3A with the zoom lens positioned at a different location.

FIG. 3A illustrates the zoom lens system of FIG. 1A except that the birefringent plates are replaced with a molded anti-aliasing optical surface incorporated on one of the lens elements. FIG. 3B illustrates the zoom lens system of FIG. 3A with the variator group located at a different axial position. The reference numerals used in FIGS. 3A and 3B are the same as those used in FIGS. 1A and 1B. Preferably, the anti-aliasing optical surface is placed near the aperture stop 142. In one embodiment, the anti-aliasing surface of the present invention is comprised of a periodic structure placed near to the aperture stop 142 that produces an anti-aliasing image structure that is insensitive to the relative aperture, object distance, and zoom position. The incident wavefront in this method is not divided into four segments that converge to four point images as in the prior art. The anti-aliasing surface adds a perturbation to the entire wavefront that causes it to spread out into one large blur (rather than four discrete points). This perturbation is periodic across the surface of the wavefront so that the image spreading occurs almost in the same manner irrespective of whether the relative aperture is f/2.8 or f/10.0.

The concept is best explained by the Fourier optics view of imaging. A plane wavefront is converted by a perfect lens into a spherical wavefront that converges to a point image. Real lenses modify this point image by diffraction (to produce the airy disk) and by geometric aberrations. The novel anti-aliasing feature modifies the spherical converging wavefront to a wavefront that is primarily spherical but which has small local periodic deformations that cause the image of a point to be spread in a controlled manner.

Figure 4A:
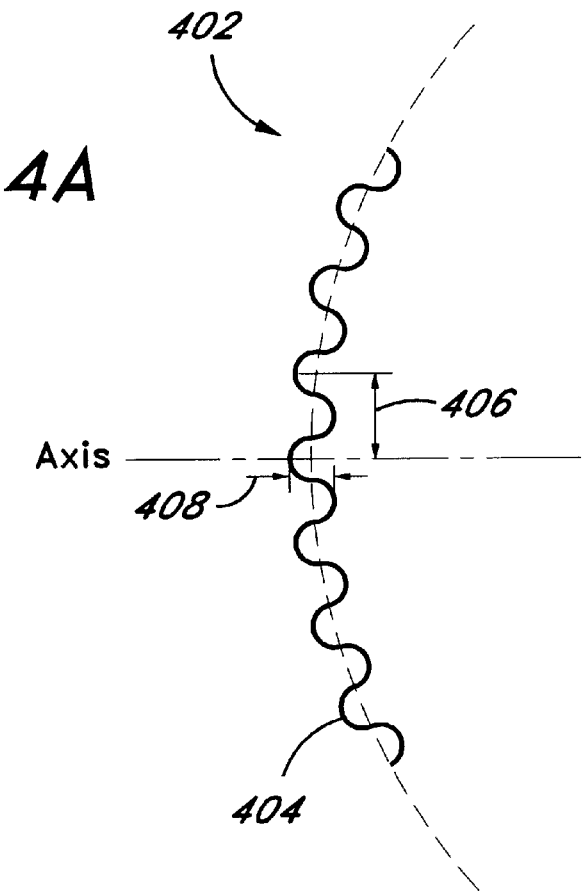
FIG. 4A illustrates an expanded side view of an anti-alias surface of the present invention.

FIG. 4A illustrates an expanded side view of an anti-alias surface 402 of the present invention. Referring to FIG. 4A, the lens element surface 402 includes a radially-symmetric periodic "cosine-like" surface 404 molded on the lens element surface 402. The periodic surface 402 (or microscopic ripple) causes the image of a point to be spread in a controlled manner. In the preferred embodiment, the lens element surface 402 is either the second surface 116 of the second lens element 104 or the first surface 118 of the third lens element 106. The period 406 and depth 408 of the rippled surface are carefully selected and optimized to control the size of the blur and the manner in which energy is distributed.

In one embodiment, the radially-symmetric cosine ripple has a constant amplitude and at least two periods across the semi-diameter of the aperture stop 142. In a second embodiment, the cosine ripple has a monotonically decreasing amplitude across the aperture. In a third embodiment, the cosine ripple has a monotonically changing period across the aperture. In yet a fourth embodiment, the cosine ripple has both a monotonically decreasing amplitude and changing period across the aperture. The cosine ripple is created on a tool, typically made out of stainless steel. The lens element is then injection molded with hot plastic which forms the ripple on the surface.

Figure 4B:
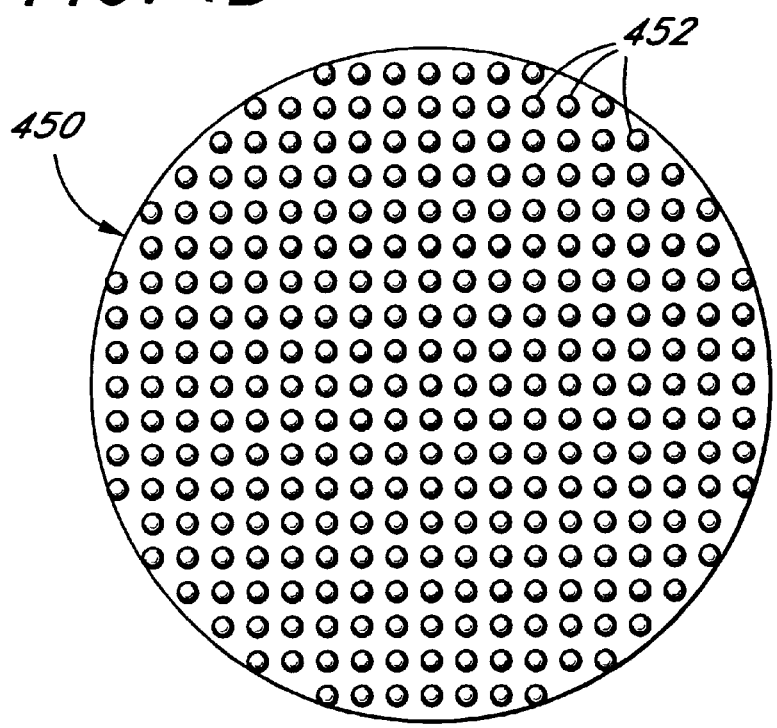
FIG. 4B illustrates another embodiment of an anti-alias surface of the present invention.

FIG. 4B illustrates another embodiment of an anti-alias surface of the present invention. In this embodiment, a "puckered" surface 450 is used and includes an array of dimples or "bumps" 452. The array of "bumps" 452 perturbs the wavefront from a point object so that it spreads into a single blur that is insensitive to the relative aperture, object distance, or zoom position. All of these features perturb the spherical converging wavefront from the zoom lens so that it produces a controlled blurred image of a point object.

In the preferred embodiment, the zoom lens system of the present invention achieves a fast relative aperture (f/2.8) and a moderately large field of view of 50 degrees using four plastic lens elements in a very compact form. Prior art lens systems with the same relative aperture and field of view typically require seven lens elements using high index optical glasses which are very expensive to produce. The present invention achieves a four lens element zoom lens system by using a diffractive surface on one of the moving lens elements and a flint-like lens element to correct chromatic aberrations. A plurality of light suppression elements are provided to suppress and prevent stray light from entering the non-optical portions of the lens elements and dispersing onto the detector array. In addition, a cosine-like structure or a "puckered" structure is molded on a lens element surface to minimize aliasing effects (e.g., Moiré effects).

As shown below, Tables 1–3 provide an exemplary design prescription for the zoom lens system 100 of FIGS. 1A and 1B. It is appreciated that the design prescription only describes one embodiment and is not intended to limit the spirit and scope of the invention. Other design modifications may be made such as, but not limited or restricted to, changes in dimensions, focal length, zoom distance, lens material, lens size, lens thickness, aspheric surface equations, and the like depending on design criteria.

TABLE 1

(Dimensions are in Millimeters)

| SURFACE | RADIUS | THICKNESS | MATERIAL |
| --- | --- | --- | --- |
| OBJECT SURFACE | | Z0 | |
| 1 (126 - front) | INF | 0.800 | Schott B270 |
| 2 (126 - back) | INF | 1.500 | |
| 3 (110) | Asphere | 4.000 | Acrylic |
| 4 (112) | Asphere | Z1 | |
| 5 (114) | Asphere | 5.500 | Polycarbonate |
| 6 (116) | −40.866 | 4.794 | |
| 7 (118) | −171.280 | 4.500 | Acrylic |
| 8 (120) | Asphere | 1.000 | |
| 9 (142) | INF | Z2 | |
| 10 (122) | Asphere | 4.500 | Acrylic |
| 11 (124) | −75.221 | 1.100 | |
| 12 ($146_1$ - front) | INF | 2.670 | Quartz |
| 13 ($146_1$ - back) | INF | 1.000 | Quartz |
| 14 ($146_2$ - front) | INF | 2.670 | Quartz |
| 15 ($146_2$ - back) | INF | 0.500 | |
| 16 (130 - front) | INF | 0.700 | Schott K5 |
| 17 (130 - back) | INF | 0.570 | |
| IMAGE SURFACE | | | |

TABLE 2

(Dimensions are in Millimeters)

| FOCAL LENGTH | Z0 | Z1 | Z2 |
| --- | --- | --- | --- |
| 13.000 | 2500 | 5.620 | 13.575 |
| 6.370 | 890 | 16.196 | 3.000 |

TABLE 3

ASPHERIC SURFACE EQUATION $$SAG = \frac{cr^2}{1 + SQRT[1 - (1+k)c^2 r^2]} + Ar^4 + Br^6 + Cr^8 + Dr^{10}$$

| | Surface 3 | Surface 4 | Surface 5 | Surface 8 | Surface 10 |
| --- | --- | --- | --- | --- | --- |
| c | 0.075254 | 0.258838 | 0.059352 | −0.08008 | 0.050659 |
| k | 0.0 | −1.414411 | 0.0 | 0.0 | 0.0 |
| A | −0.60886e−3 | 0.0 | −0.10754e−3 | −2.6407e−5 | −0.1963e−3 |
| B | 0.53506e−5 | 0.0 | −0.13656e−5 | −3.0327e−6 | 0.16165e−5 |
| C | −0.35122e−7 | 0.0 | 0.0 | 1.7892e−7 | −0.18069e−7 |
| D | 0.95032e−10 | 0.0 | 0.0 | 0.0 | 0.0 |
| HOE Phase Coefficients on Surface 8 | | | C1 = 2.8024e−3 | | C2 = −4.1499e−5 |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A compact zoom lens system comprising:
    a first lens element and a second lens element, a surface on one of the first and second lens elements having a diffractive optical surface disposed thereon;
    an aperture stop; and
    a lens carrier coupled to the first and second lens elements, and the aperture stop, the lens carrier to move the first and second lens elements and the aperture stop axially to correct chromatic aberrations of light passing therethrough over a plurality of focal lengths.

2. The zoom lens system of claim 1 further comprising a third lens element placed in front of the first and second lens elements, and a fourth lens element placed behind the first, second, and third lens elements.

3. The zoom lens system of claim 2 wherein one of the first and second lens elements is made from flint-like material and the other of the first and second lens elements, and the third and fourth lens elements are from crown-like material.

4. The zoom lens system of claim 3 wherein the third lens element modifies a field of view of the zoom lens system, and the fourth lens element reduces the focal length of the zoom lens system.

5. The zoom lens system of claim 3 further comprising a detector array placed behind the first through fourth lens elements.

6. The zoom lens system of claim 5 further comprising an opaque bezel placed in front of the third lens element, the opaque bezel to prevent stray light from entering a non-optical portion of the third lens element and scattering across the detector array.

7. The zoom lens system of claim 6 further comprising a first black mylar disk placed behind a non-optical portion of the third lens element, a second black mylar disk placed in front of a non-optical portion of the first lens element, and a third black mylar disk placed behind a non-optical portion of the fourth lens element to suppress stray light.

8. The zoom lens system of claim 5 further comprising a pair of birefringent plates placed in front of the detector array to minimize aliasing effects.

9. The zoom lens system of claim 5 further comprising a periodic surface molded on one of the surfaces of the first and second lens elements, the periodic surface to minimize aliasing effects.

10. The zoom lens system of claim 5 further comprising a puckered surface having an array of bumps molded on one of the surfaces of the first and second lens elements, the puckered surface to minimize aliasing effects.

11. The zoom lens system of claim 3 wherein the third lens element and alternatively the fourth lens element to move axially to achieve true zoom lens behavior and maintain parfocal imaging.

12. The zoom lens system of claim 2 wherein the first through fourth lens elements are made from crown-like material.

13. The zoom lens system of claim 12 wherein one of the surfaces of the third lens element has a second diffractive optical surface disposed thereon.

14. The zoom lens system of claim 2 wherein the first lens element is made from flint-like material and the second, third, and fourth lens elements are made from crown-like material, wherein the diffractive optical surface is placed on a back surface of the second lens element, and wherein the aperture stop is placed proximate to the back surface of the second lens element.

15. The zoom lens system of claim 1 wherein a diameter of the aperture stop changes as the lens carrier is moved axially to achieve a constant relative aperture along an entire focal length of the zoom lens system.

16. A zoom lens system comprising:
   a first lens element;
   a second lens element placed in front of the first lens element, the second lens element including a diffractive optical surface disposed on one of its surfaces to correct chromatic aberrations of light passing therethrough;
   a third lens element placed in front of the first and second lens elements;
   a fourth lens element placed in front of the first through third lens elements; and
   a lens carrier coupled to the second and third lens elements, the lens carrier to axially move the second and third lens elements over two or more focal lengths.

17. The zoom lens system of claim 16 wherein the lens carrier includes an aperture stop, said lens carrier to axially move the second and third lens elements and the aperture stop to correct chromatic aberrations of light over the two or more focal lengths.

18. The zoom lens system of claim 17 wherein the first, second, and fourth lens elements are made from crown-like material, and the third lens element is made from flint-like material.

19. The zoom lens system of claim 17 wherein the fourth lens element includes a second diffractive optical surface disposed on one of its surfaces.

20. The zoom lens system of claim 19 wherein each of the first, second, and fourth lens elements is made from one of the following: acrylic and cyclic olefin co-polymer; and the third lens element is made from one of the following: acrylic, cyclic olefin co-polymer, SAN, NAS, and polycarbonate, and styrene.

21. The zoom lens system of claim 17 further comprising a detector array placed behind the first through fourth lens elements.

22. The zoom lens system of claim 21 further comprising an opaque bezel placed in front of the fourth lens element, the opaque bezel to prevent stray light from entering a non-optical portion of the fourth lens element and scattering across the detector array.

23. The zoom lens system of claim 21 further comprising a first black mylar disk placed behind a non-optical portion of the fourth lens element, a second black mylar disk placed in front of a non-optical portion of the third lens element, and a third black mylar disk placed behind a non-optical portion of the first lens element to suppress stray light.

24. The zoom lens system of claim 21 further comprising a pair of birefringent plates placed in front of the detector array to minimize aliasing effects.

25. The zoom lens system of claim 21 further comprising a periodic surface molded on one of the surfaces of the second and third lens elements, the periodic surface to minimize aliasing effects.

26. The zoom lens system of claim 21 further comprising a puckered surface having an array of bumps molded on one of the surfaces of the second and third lens elements, the puckered surface to minimize aliasing effects.

27. The zoom lens system of claim 17 wherein a diameter of the aperture stop changes as the lens carrier is moved axially to achieve a constant relative aperture along the entire focal length of the zoom lens system.

* * * * *